(12) United States Patent
Van Bommel

(10) Patent No.: US 12,331,893 B2
(45) Date of Patent: Jun. 17, 2025

(54) LIGHT EMITTING DEVICE

(71) Applicant: SIGNIFY HOLDING B.V., Eindhoven (NL)

(72) Inventor: Ties Van Bommel, Horst (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/689,203

(22) PCT Filed: Sep. 1, 2022

(86) PCT No.: PCT/EP2022/074277
§ 371 (c)(1),
(2) Date: Mar. 5, 2024

(87) PCT Pub. No.: WO2023/031314
PCT Pub. Date: Mar. 9, 2023

(65) Prior Publication Data
US 2025/0129901 A1    Apr. 24, 2025

(30) Foreign Application Priority Data

Sep. 6, 2021   (EP) .................................... 21195005

(51) Int. Cl.
*F21K 9/00* (2016.01)
*F21K 9/232* (2016.01)
(Continued)

(52) U.S. Cl.
CPC ............... *F21K 9/61* (2016.08); *F21K 9/232* (2016.08); *F21K 9/65* (2016.08); *G02B 6/0036* (2013.01);
(Continued)

(58) Field of Classification Search
CPC ... F21K 9/61; F21K 9/232; F21K 9/65; G02B 6/0036; G02B 6/0068; G02B 6/0073
See application file for complete search history.

(56) References Cited

U.S. PATENT DOCUMENTS 9,028,120 B2 * 5/2015 Dau ..................... G02B 6/0096
                                                                362/555
9,677,738 B2 * 6/2017 Sun ........................ F21V 29/773
(Continued)

FOREIGN PATENT DOCUMENTS

CN         204254304 U    4/2015
CN         207424459 U    5/2018
(Continued)

*Primary Examiner* — Gerald J Sufleta, II

(57) ABSTRACT

A light emitting device (1) comprising a light guide (2) and a first solid-state light source filament (3), the first solid-state light source filament (3) comprising a carrier (4) comprising a first side (41) and an opposite second side (42), a first plurality of solid-state light sources (5) being arranged on the first side (41) of the carrier (4), and a second plurality of solid-state light sources (6) being arranged on the second side (42) of the carrier (4). The first plurality of solid-state light sources (5) are adapted for, in operation, emitting first solid state light source light (L1), the first solid state light source light being emitted from a first light exit surface (12a) of the first solid-state light source filament as first output light (L1'), and the second plurality of solid-state light sources being adapted for, in operation, emitting second solid-state light source light (L2), the second solid state light source light being emitted from a second light exit surface (12b) of the first solid-state light source filament as second output light (L2'), the first output light (L1') being different from the second output light (L2') in terms of any one or more of different color points and different correlated color (Continued)

temperatures, and only one of the first side (41) and the second side (42) of the carrier (4) is optically coupled to the light guide (2).

15 Claims, 7 Drawing Sheets

(51) Int. Cl.
    *F21K 9/61*         (2016.01)
    *F21K 9/65*         (2016.01)
    *F21V 8/00*         (2006.01)
    *F21Y 105/18*      (2016.01)
    *F21Y 115/10*      (2016.01)

(52) U.S. Cl.
    CPC .......... *G02B 6/0068* (2013.01); *G02B 6/0073* (2013.01); *F21V 2200/20* (2015.01); *F21Y 2105/18* (2016.08); *F21Y 2115/10* (2016.08)

(56) References Cited

U.S. PATENT DOCUMENTS

| | | | |
|---|---|---|---|
| 2011/0310587 A1* | 12/2011 | Edmond | G02B 6/0096 362/84 |
| 2017/0051877 A1* | 2/2017 | Weijers | F21K 9/232 |
| 2018/0283620 A1 | 10/2018 | Cao et al. | |
| 2020/0141541 A1* | 5/2020 | Van Bommel | F21K 9/61 |
| 2021/0332954 A1* | 10/2021 | Wen | F21K 9/61 |
| 2022/0390074 A1* | 12/2022 | Van Der Lubbe | F21K 9/232 |
| 2023/0280002 A1* | 9/2023 | Van Bommel | F21K 9/61 362/84 |

FOREIGN PATENT DOCUMENTS

| | | |
|---|---|---|
| WO | 2018202625 A1 | 11/2018 |
| WO | 2020083647 A1 | 4/2020 |
| WO | 2020207852 A1 | 10/2020 |
| WO | 2021094257 A1 | 5/2021 |

* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2022/074277, filed on Sep. 1, 2022, which claims the benefit of European Patent Application No. 21195005.0, filed on Sep. 6, 2021. These applications are hereby incorporated by reference herein.

FIELD OF THE INVENTION

The invention relates to a light emitting device comprising a light guide and a first solid-state light source filament.

BACKGROUND OF THE INVENTION

Incandescent lamps are rapidly being replaced by LED based lighting solutions. It is nevertheless appreciated and desired by users to have retrofit lamps which have the look of an incandescent bulb. For this purpose, one can simply make use of the infrastructure for producing incandescent lamps based on glass and replace the filament with LEDs emitting white light. One known concept is based on LED filaments placed in such a bulb. The appearances of these lamps are highly appreciated as they look highly decorative.

For instance, US 2018/0283620 A1 discloses a lighting device which includes a filament, a filament fixing element, a driving circuit, a lamp holder and a bulb shell. The filament has a long strip bottom, installed with a plurality of LED modules. The filament fixing element has a bearing surface and a heat dissipation part. The bearing surface connects to the long strip bottom of the filament. The heat dissipation part is connected to the bearing surface to dissipate the heat. The driving circuit provides a suitable current to the filament for emitting light. The lamp holder houses the drive circuit and carries the filament fixing element. The bulb shell and the lamp holder constitute an accommodating space for receiving the filament and the filament fixing element.

It is desired to improve the spectral and/or spatial light distribution and thus the appearance of LED filament lamps of the above-described type.

SUMMARY OF THE INVENTION

It is an object of the present invention to overcome this problem, and to provide a light emitting device of the type mentioned by way of introduction with any one or more of an improved spectral light distribution and an improved spatial light distribution.

It is a further object of the invention to thereby provide a light emitting device with an improved appearance.

According to a first aspect of the invention, this and other objects are achieved by means of a light emitting device comprising a light guide and a first solid-state light source filament, the first solid-state light source filament comprising a carrier comprising a first side and a second side opposite to the first side, a first plurality of solid-state light sources being arranged on the first side of the carrier, and a second plurality of solid-state light sources being arranged on the second side of the carrier, where the first plurality of solid-state light sources being adapted for, in operation, emitting first solid state light source light, the first solid state light source light being emitted from a first light exit surface of the first solid-state light source filament as first output light, and the second plurality of solid-state light sources being adapted for, in operation, emitting second solid-state light source light, the second solid state light source light being emitted from a second light exit surface of the first solid-state light source filament as second output light, the first output light being different from the second output light in terms of any one or more of different color points and different correlated color temperatures, and where only one of the first side and the second side of the carrier is optically coupled to the light guide.

Thereby, and in particular by providing that the first plurality of solid-state light sources being adapted for, in operation, emitting first solid state light source light, the first solid state light source light being emitted from a first light exit surface of the first solid-state light source filament as first output light and the second plurality of solid-state light sources being adapted for, in operation, emitting second solid-state light source light, the second solid state light source light being emitted from a second light exit surface of the first solid-state light source filament as second output light, the first output light being different from the second output light in terms of any one or more of different color points and different correlated color temperatures, and that only one of the first side and the second side of the carrier is optically coupled to the light guide, a light emitting device is provided with which at least one of an improved spectral light distribution and an improved spatial light distribution is obtained.

Such a light emitting device is thereby provided with an improved appearance. Thus, using such a light emitting device in a lamp or a luminaire in turn provides for a lamp or a luminaire with a light output having an improved appearance.

In an embodiment, the one of the first side and the second side of the carrier being optically coupled to the light guide is further physically coupled to the light guide e.g. via an encapsulant.

Thereby, a more robust and durable light emitting device is provided for.

In an embodiment, the light guide comprises a first major surface, a second major surface and at least one edge surface extending between the first major surface and the second major surface, and wherein the first solid-state light source filament is optically coupled to the at least one edge surface. The surface area of the first major surface and/or the second major surface may be at least 4 cm², preferably at least 8 cm², more preferably at least 10 cm², most preferably at least 12 cm².

In embodiments, the first major surface and/or the second major surface of the light guide have a polygonal shape having at least 3 sides, preferably 4 sides.

In embodiments, the first major surface and/or the second major surface of the light guide have a longest length, wherein the longest length of the first major surface and/or the second major surface of the light guide is larger than the length of the first and/or second solid-state light source filaments.

In embodiments, the light guide is flat or non-flat e.g. curved.

Thereby, a light emitting device is provided which ensures a more directionally focused light output.

In an embodiment, the first solid-state light source filament is further physically coupled to the at least one edge surface.

Thereby, a more robust and durable light emitting device is provided for.

In an embodiment, the light guide comprises a shape selected from the group comprising flat, crown-shaped, twisted and helix-shaped.

Thereby, a light emitting device is provided for which may be adapted for a wide variety of uses and appearances.

In an embodiment, the light guide comprises light-outcoupling elements, where at least a part of the light which is coupled into the light guide is guided in the light guide, and where at least part of the light which is guided in the light guide is coupled out of the light guide via the light-outcoupling elements.

Thereby a light emitting device with a further improved spectral light distribution and a further improved spatial light distribution is provided. Further, it is ensured that light is coupled out of the light guide at a desired location and in a desired direction.

In an embodiment, the light-outcoupling elements are arranged on a surface extending opposite to a surface to which the carrier is optically coupled.

Thereby a light emitting device is provided with which it is ensured that light is coupled out of the light guide in such a location and manner that minimal interference with the solid-state light source filament is ensured.

In an embodiment, the light-outcoupling elements are chosen from the group comprising refractive elements, reflective elements, diffractive elements, scattering elements and combinations thereof.

Thereby, a particularly efficient light outcoupling with low losses is obtained.

In an embodiment, the light emitting device further comprises a second solid-state light source filament, the second solid-state light source filament being optically coupled to the at least one edge surface in a position different from a position of the first solid-state light source filament.

Thereby, a light emitting device is provided for with which a light output with a higher intensity may be obtained.

In an embodiment, the second solid-state light source filament is further physically coupled to the at least one edge surface in the position different from a position of the first solid-state light source filament.

Thereby, a light emitting device is provided for with which not only a light output with a higher intensity may be obtained, but which is also more robust and durable.

In an embodiment, at least one of the first solid-state light source filament and the second solid-state light source filament is encapsulated by an encapsulant.

In an embodiment, the first solid-state light source filament comprises a first encapsulant encapsulating the first plurality of solid-state light sources and a second encapsulant encapsulating the second plurality of solid-state light sources.

Thereby, the solid-state light source filaments may be protected from outside influences, such that a particularly robust and durable light emitting device is provided for.

In an embodiment, at least one of the first solid-state light source filament and the second solid-state light source filament is flexible. For example, the carrier may be flexible.

Thereby, the first and second solid-state light source filament may easily and without breaking be optically and particularly physically coupled to the light guide, even to a twisted or otherwise curved or non-straight surface of the light guide.

In an embodiment, the encapsulant comprises a light scattering material adapted for scattering light emitted by one or more of the first plurality of solid-state light sources and the second plurality of solid-state light sources of the first solid-state light source filament and a plurality of solid-state light sources of the second solid-state light source filament.

Such a light scattering material may by way of non-limiting examples be $BaSO_4$, $Al_2O_3$ and/or $TiO_2$ particles. A light scattering material scatters solid-state light source light, and thus influences the light output, for instance to provide a light output being more evenly distributed over an outer envelope of the light emitting device.

In an embodiment, the encapsulant comprises a luminescent material adapted for converting at least a part of light emitted by one or more of the first plurality of solid-state light sources and the second plurality of solid-state light sources of the first solid-state light source filament and the plurality of solid-state light sources of the second solid-state light source filament.

A luminescent material converts solid-state light source light into converted solid-state light source light. The output light may thus comprise solid-state light source light and/or converted solid-state light source light. The provision of a luminescent material thus provides for further parameters for influencing the light output of the light emitting device, e.g. to fit to a particular use.

In an embodiment, the first encapsulant comprises any one or more of a first light scattering material adapted for scattering the first solid-state light source light emitted by the first plurality of solid-state light sources of the first solid-state light source filament, and a first luminescent material adapted for converting at least a part of the first solid-state light source light emitted by the first plurality of solid-state light sources of the first solid-state light source filament, and the second encapsulant comprises any one or more of a second light scattering material adapted for scattering the second solid-state light source light emitted by the second plurality of solid-state light sources of the first solid-state light source filament, and a second luminescent material adapted for converting at least a part of the second solid-state light source light emitted by the second plurality of solid-state light sources of the first solid-state light source filament.

The first output light may thus comprise one or more of first solid-state light source light, converted first solid-state light source light and scattered first solid-state light source light. Likewise, the second output light may thus comprise one or more of second solid-state light source light, converted second solid-state light source light and scattered second solid-state light source light.

In an embodiment, where the first encapsulant comprises a first luminescent material adapted for converting at least a part of the first solid-state light source light emitted by the first plurality of solid-state light sources of the first solid-state light source filament and the second encapsulant comprises a second luminescent material adapted for converting at least a part of the second solid-state light source light emitted by the second plurality of solid-state light sources of the first solid-state light source filament, the first encapsulant and the second encapsulant differ in terms of any one or more of (i) a concentration of luminescent material in the respective encapsulant, (ii) a type of luminescent material in the respective encapsulant, and (iii) a layer thickness of the respective encapsulant.

Thereby, the difference between the first output light and the second output light in terms of any one or more of different color points and different correlated color temperatures may be obtained by use and choice of the luminescent material. In such an embodiment, the first and second solid-state light sources may be identical solid-state light sources, such as e.g. solid-state light sources emitting blue light of the same wavelength. Also, in such an embodiment the first and second light exit surfaces of the solid-state light source filament corresponds to respective outer surfaces of a respective encapsulant.

In an embodiment, one of the first plurality of solid-state light sources and the second plurality of solid-state light sources is adapted for providing first light in a direction away from a first surface of the carrier and the other one of the first plurality of solid-state light sources and the second plurality of solid-state light sources is adapted for providing second light in a direction away from a second surface of the carrier opposite to the first surface of the carrier.

In an embodiment, one of the first plurality of solid-state light sources and the second plurality of solid-state light sources is adapted for providing first light in a direction away from the light guide and the other one of the first plurality of solid-state light sources and the second plurality of solid-state light sources is adapted for providing second light in a direction towards the light guide.

Thereby, a light emitting device is provided with which a light output with a more complex pattern may be obtained, and with which light output in two different directions may be obtained simultaneously.

In an embodiment, the first solid-state light source light emitted by the first solid-state light source filament is white light and the second solid-state light source light emitted by the second solid-state light source filament is colored light.

In an embodiment, the first solid-state light source light emitted by the first solid-state light source filament is white light comprising a first color temperature, CT1, and the second solid-state light source light emitted by the second solid-state light source filament is light comprising a second color temperature, CT2, being different from the first color temperature.

In an embodiment, the first color temperature is less than 2500 K, less than 2300 K, less than 2200 K, or even less than 2100 K, such as for example 2000 K.

In an embodiment, the second color temperature is at least 2700 K, at least 3000 K, at least 3300 K, or at least 3500 K, such as for example 4000 K.

In an embodiment, difference between the first and the second color temperature, |CT2-CT1|, is at least 300 K, at least 500 K, at least 700 K, or at least 900 K, such as for example 1000 K.

In an embodiment, one or more of the first plurality of solid-state light sources and the second plurality of solid-state light sources of the first solid-state light source filament and a plurality of solid-state light sources of the second solid-state light source filament are chosen from the group comprising laser light sources, LEDs, UV LEDs, blue LEDs and white LEDs. In case of comprising blue LEDs, the solid-state light source filament may advantageously further comprise an encapsulant comprising a luminescent material such as to provide a solid-state light source filament yielding a suitable converted light output.

The invention further concerns a luminaire or a lamp comprising at least one light emitting device according to the invention.

The luminaire or lamp may further comprise a controller for individually controlling at least the first plurality of solid-state light sources and the second plurality of solid-state light sources.

The controller may be adapted for controlling at least the first plurality of solid-state light sources, and thus solid-state light source light coupled into the light guide, and the second plurality of solid-state light sources, and thus solid-state light source light not coupled into the light guide, individually and thus independently from one another.

The luminaire or lamp may further comprise an envelope at least partially enveloping the light emitting device, or at least the first solid-state light source filament of the light emitting device.

The luminaire or lamp may further comprise any one or more of a cap, a threading for connection to a socket and a terminal for connection to a source of electrical energy.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
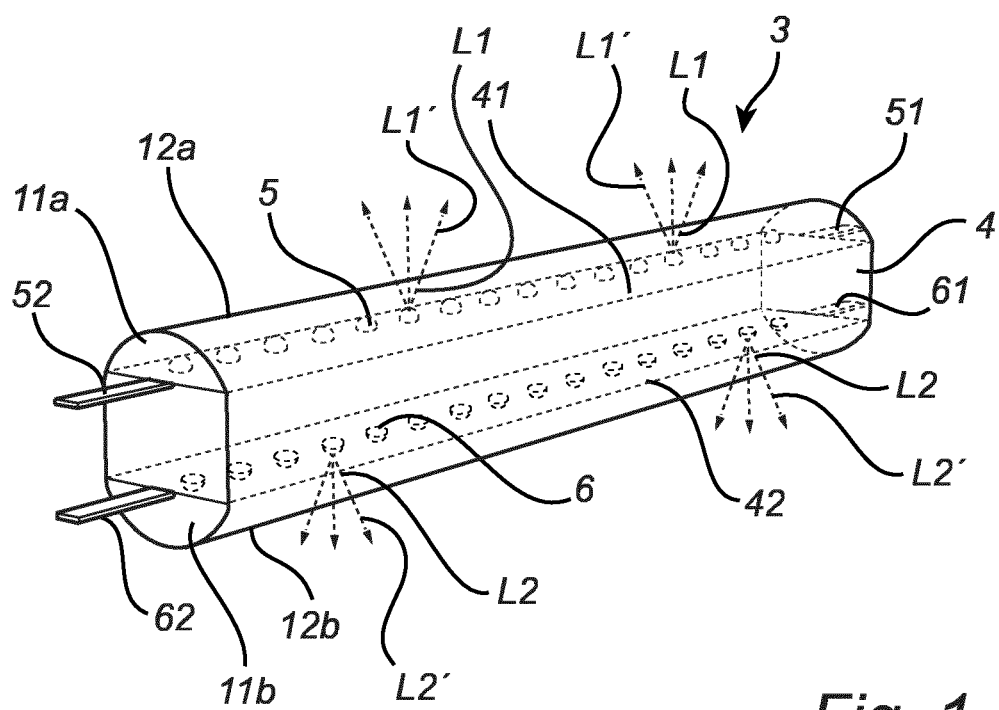
FIG. 1 shows a perspective view of a solid-state light source filament of a light emitting device according to the invention.

FIG. 1 shows a perspective view of a solid-state light source filament 3 of a light emitting device 1 (cf. e.g. FIG. 4) according to the invention. The solid-state light source filament 3 generally comprises a carrier 4, a first plurality of solid-state light sources 5 and a second plurality of solid-state light sources 6.

The carrier 4 comprises a first side 41 and a second side 42. The first side 41 and the second side 42 generally and for all embodiments extend opposite to one another. As shown in FIG. 1, the first side 41 and the second side 42 more particularly extend parallel to one another and opposite to one another. The carrier 4 may be any suitable type of substrate, such as, but not limited to, a ceramic substrate.

The carrier 4 may be provided with a rectangular cross-section as shown on FIG. 1. The carrier 4 may also be flat. The carrier 4 may also comprise another cross-sectional shape, such as oval, circular or even triangular.

Figure 4:
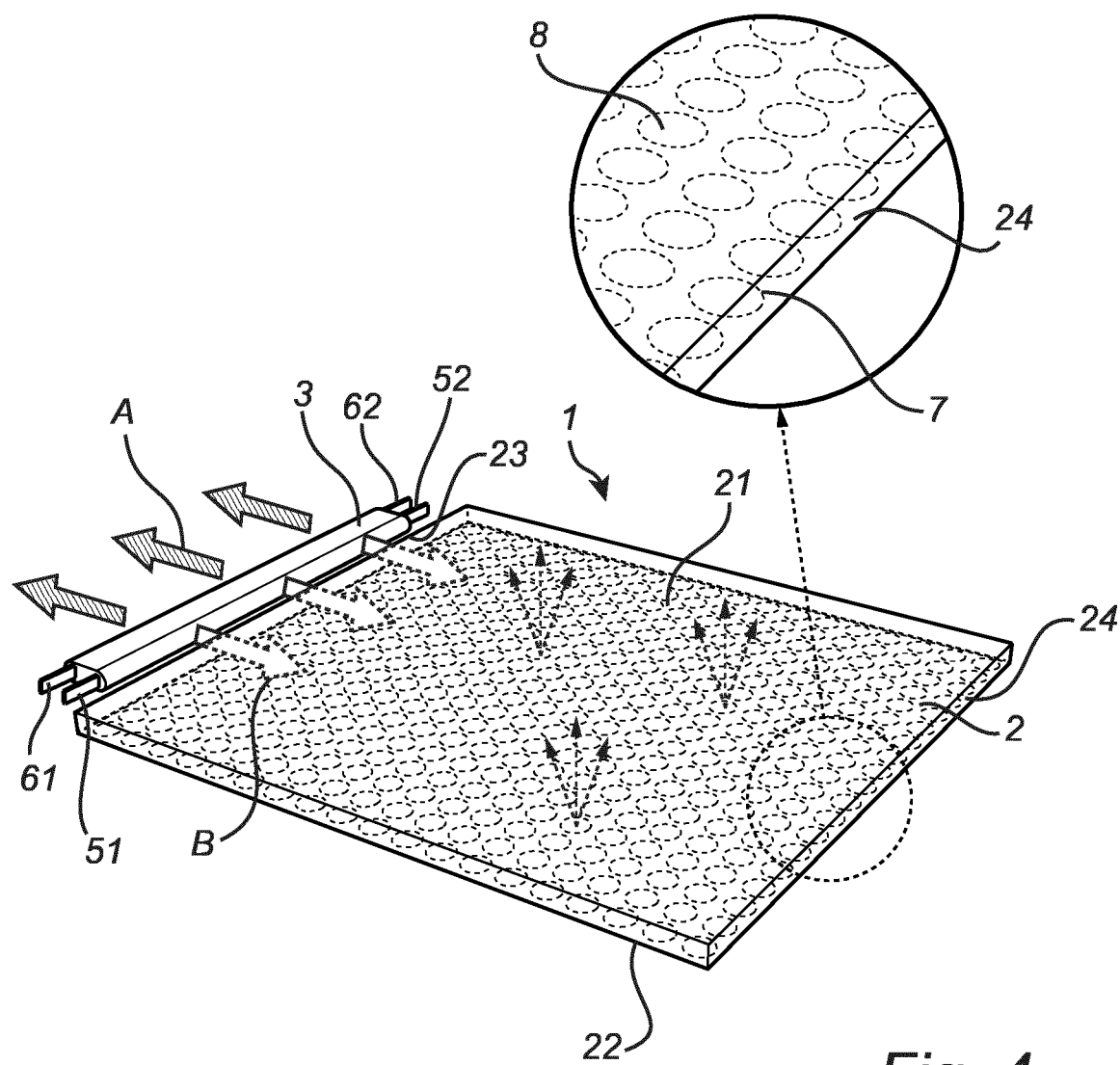
FIG. 4 shows a perspective view of a light emitting device according to a first embodiment of the invention.

The first plurality of solid-state light sources 5 are arranged on the first side 41 of the carrier 4. The second plurality of solid-state light sources 6 are arranged on the second side 42 of the carrier 4. Referring also to FIG. 4, the first solid-state light sources 5 of the light source filament 3 is adapted for providing first solid-state light source light L1 in a direction A away from a first surface 41 of the carrier 4 and the second solid-state light sources 6 of the light source filament 3 is adapted for providing second solid-state light source light L2 in a direction B away from a second surface 42 of the carrier 4 opposite to the first surface 41 of the carrier 4, or vice versa. The first solid-state light source light L1, or at least a majority thereof, provided by the first solid-state light sources 5 is coupled into the light guide 2, while the second solid-state light source light L2, or at least a majority thereof, provided by the second solid-state light sources 6 is not coupled into the light guide 2, or vice versa.

The solid-state light source filament 3 further comprises a first light exit surface 12a and a second light exit surface 12b. In the embodiment shown on FIG. 1, the first light exit surface 12a and the second light exit surface 12b are surfaces of a first encapsulant 11a and a second encapsulant 11b, respectively, to be described in further detail below. Alternatively, if no encapsulant is provided, the first light exit surface 12a and the second light exit surface 12b may be equivalent to surfaces of the first solid-state light sources 5 and the second solid-state light sources 6, respectively. In any event, the first solid state light source light L1 is emitted from the first light exit surface 12a of the solid-state light source filament 3 as first output light L1', and the second solid-state light source light L2 is emitted from the second light exit surface 12b of the solid-state light source filament 3 as second output light L2'.

The first plurality of solid-state light sources 5 is adapted for, in operation, emitting first solid-state light source light L1. The second plurality of solid-state light sources 6 are adapted for, in operation, emitting second solid-state light source light L2. The first solid-state light source light L1 comprises a first color point and a first color temperature. The second solid-state light source light L2 comprises a second color point and a second color temperature. At least one of, on the one hand the first color point and the second color point, and on the other hand the first color temperature and the second color temperature, are mutually different. The first plurality of solid-state light sources 5 and the second plurality of solid-state light sources 6 of the first solid-state light source filament 3 are chosen from the group comprising laser light sources, LEDs, UV LEDs, blue LEDs and white LEDs.

The first plurality of solid-state light sources 5 further comprise connection elements 51, 52 adapted for connection to an energy source for providing electrical energy to the first plurality of solid-state light sources 5. Likewise, the second plurality of solid-state light sources 6 further comprise connection elements 61, 62 adapted for connection to an energy source for providing electrical energy to the first plurality of solid-state light sources 6.

Figure 2:
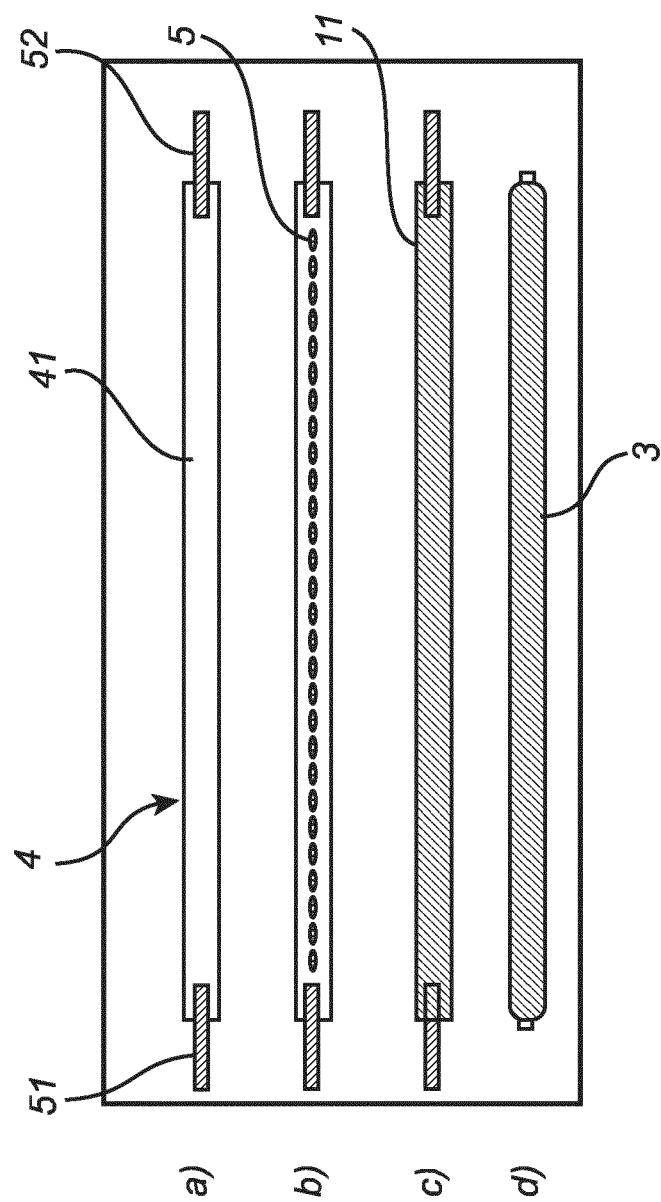
FIG. 2 shows a top view of one side of a solid-state light source filament of a light emitting device according to the invention, featuring from the top down the different components thereof and their order of assembly during manufacture.
Figure 3:
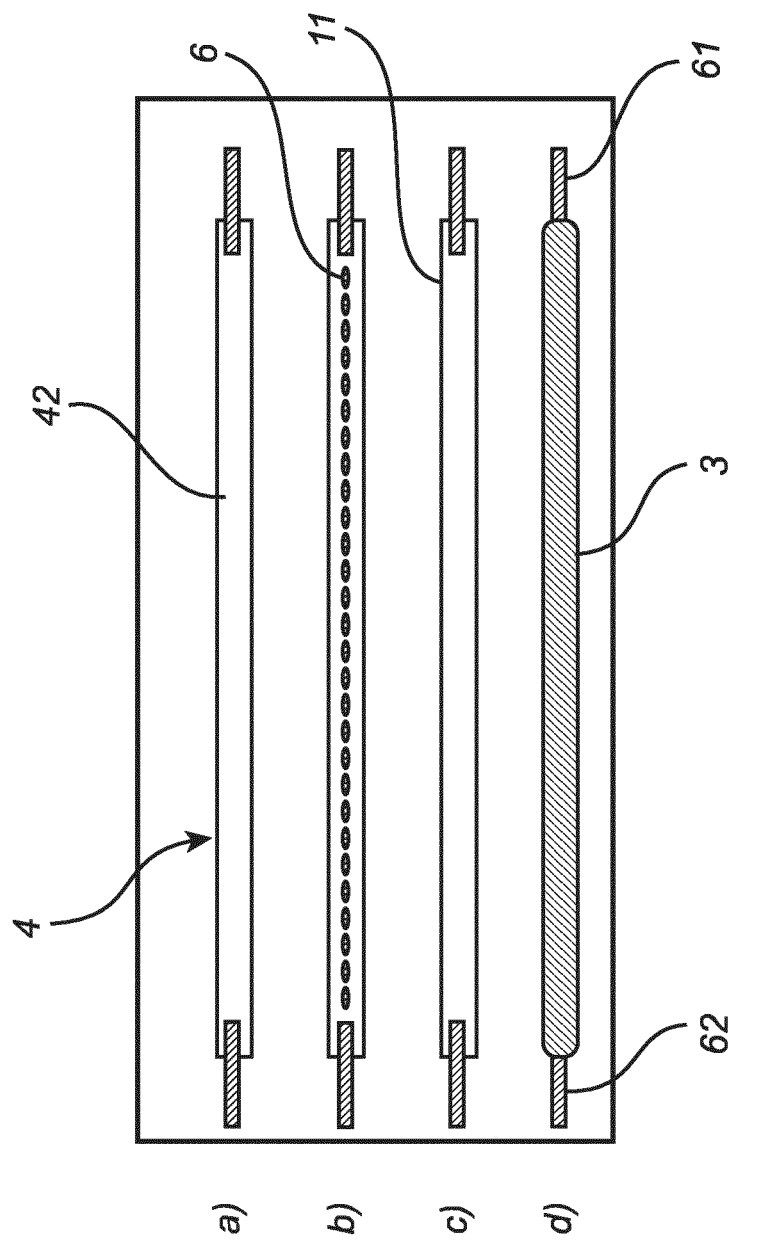
FIG. 3 shows a top view of another side, being opposite to the side shown in FIG. 2, of a solid-state light source filament of a light emitting device according to the invention, featuring from the top down the different components thereof and their order of assembly during manufacture.

FIGS. 2 and 3 show top views of the opposite sides of a solid-state light source filament 3 of a light emitting device 1 according to the invention, featuring from the top down the different components thereof. FIGS. 2 and 3 further illustrate a possible order of assembly of a solid-state light source filament 3 of a light emitting device according to the invention during manufacture. FIG. 2 shows a) the solid-state light source filament 3 seen form the first side 41 of the carrier 4, on which the electrical connection elements 51 and 52 are arranged, and b) on which the first plurality of solid-state light sources 5 are arranged. Subsequently, c) an encapsulant 11 is provided, and the carrier 4 with connection elements 51, 52 and solid-state light sources 5 are d) encapsulated in the encapsulant 11. Likewise, FIG. 3 shows a) the solid-state light source filament 3 seen form the second side 42 of the carrier 4, on which the electrical connection elements 61 and 62 are arranged, and b) on which the second plurality of solid-state light sources 6 are arranged. Subsequently, c) an encapsulant 11 is provided, and the carrier 4 with connection elements 61, 62 and solid-state light sources 6 are d) encapsulated in the encapsulant 11. The encapsulation with the encapsulant 11 may be performed separately for each side, or for both sides at the same time.

The encapsulant 11 is generally an optically transparent material which is resistant to wear and deterioration caused by the light emitted by the solid-state light sources. The encapsulant 11 may comprise a light scattering material. Alternatively, or additionally, the encapsulant may comprise a luminescent material adapted for converting at least a part of light emitted by the one or more solid-state light sources. The encapsulant 11 may enclose at least a part of the solid-state light sources 5 and 6, and the encapsulant 11 may furthermore encapsulate at least a part of the carrier 4. Thus, the encapsulant 11 encapsulating the first and second solid-state light sources 5 and 6 may be the same encapsulant.

Alternatively, and as illustrated in FIG. 1, the first solid-state light source filament 3 may comprise a first encapsulant 11a encapsulating the first plurality of solid-state light sources 5 at least partially and a second encapsulant 11b encapsulating the second plurality of solid-state light sources 6 at least partially. The first encapsulant 11a may comprises any one or more of a first light scattering material adapted for scattering light emitted by the first plurality of solid-state light sources 5, and a first luminescent material adapted for converting at least a part of light emitted by the first plurality of solid-state light sources 5. The second encapsulant 11b may comprise any one or more of a second light scattering material adapted for scattering light emitted by the second plurality of solid-state light sources 6, and a second luminescent material adapted for converting at least a part of light emitted by the second plurality of solid-state light sources 6. The first and second luminescent materials may be different luminescent materials. The first and second light scattering materials may be different light scattering materials. Thus, the encapsulants 11a and 11b may be different encapsulants or encapsulants provided with different luminescent or light scattering properties, and thereby be adapted for the solid-state light sources that they respectively encapsulate.

In embodiments where the encapsulant 11, 11a and/or 11b comprises a light scattering material or a luminescent material, the first plurality of solid-state light sources 5 and the second plurality of solid-state light sources 6 of the first solid-state light source filament 3 may both be, e.g., blue LEDs and the difference in color points or correlated color temperatures may be obtained by the light scattering material or the luminescent material converting the solid state light source light into converted solid state light source light.

FIG. 4 shows a perspective view of a light emitting device 1 according to a first embodiment of the invention. The light emitting device 1 generally comprises a light source filament 3 as described above and a light guide 2.

The light guide 2 comprises a first major surface 21, a second major surface 22 and at least one edge surface 23. The edge surface 23 extends between the first major surface 21 and the second major surface 22 of the light guide 2.

Generally, and irrespective of the embodiment, the carrier 4 of the light source filament 3 is optically coupled to the light guide 2 with one of the first side 41 and the second side 42. The one of the first side 41 and the second side 42 of the carrier 4 coupled optically to the light guide 2 may further be physically coupled to the light guide 2. More particularly, first solid-state light source filament 3 is optically coupled to the at least one edge surface 23 of the light guide. Further, the first solid-state light source filament 3 may be physically coupled to the at least one edge surface 23 of the light guide 2.

When the light source filament 3 is at least optically coupled to the light guide 2, the first solid-state light sources 5 are arranged and adapted for providing first light in a direction A away from the light guide 2, and as shown more particularly the edge surface 23 of the light guide 2, and the second solid-state light sources 6 are adapted for providing second light in a direction B towards the light guide 2, and as shown more particularly the edge surface 23 of the light guide 2, or vice versa.

As shown in the enlarged part of the light guide inserted in FIG. 4, the light guide 2 may further comprise light-outcoupling elements 7 arranged at an edge surface 24 of the light guide 2 opposite to the edge surface 23 to which the first solid-state light source filament 3 is coupled. The light guide 2 may also comprise light-outcoupling elements 8 arranged at a major surface, e.g. the major surface 21, of the light guide 2.

Generally, at least a part of the solid-state light source light from the first and second plurality of solid-state light sources 5, 6 is coupled into the light guide 2 and is guided into and through the light guide 2. At least part of the solid-state light source light which is guided into and through the light guide 2 is coupled out of the light guide 2 at a surface of the light guide 2, such as the edge surface 23, and where provided via the light-outcoupling elements 7 and 8.

Figure 5:
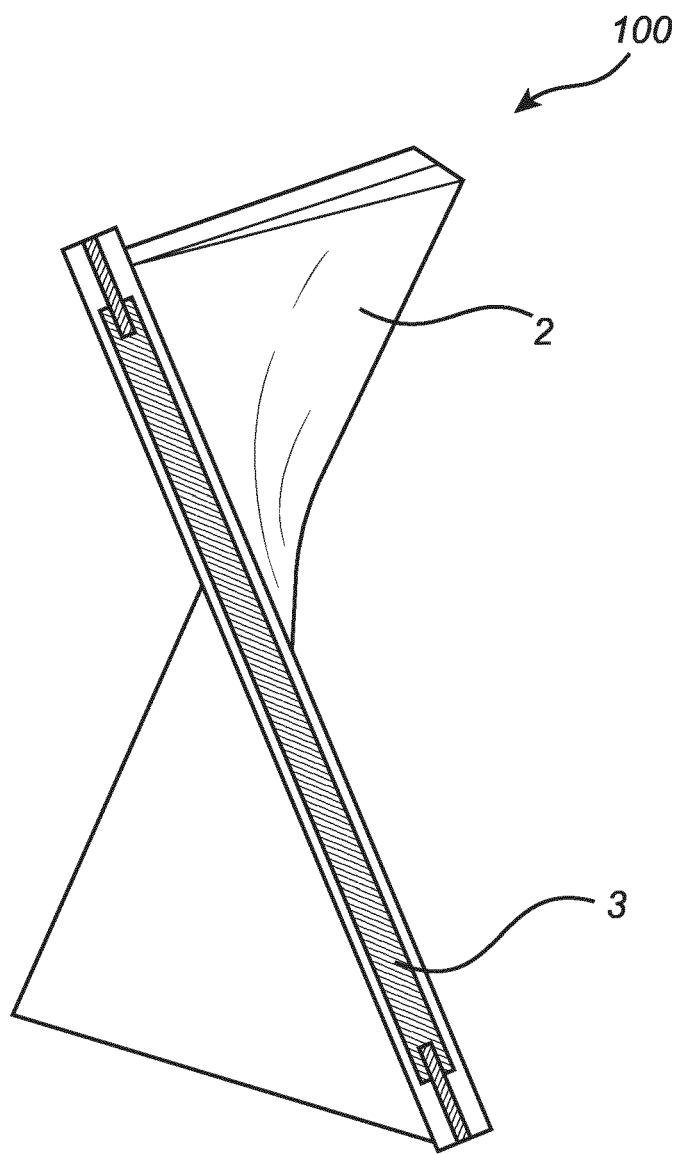
FIG. 5 shows a perspective view of a light emitting device according to a second embodiment of the invention.

FIG. 5 shows a perspective view of a light emitting device 100 according to a second embodiment of the invention. The light emitting device 100 differs from the light emitting device 1 shown in FIG. 4 and described above in that the light guide 2 is a twisted light guide. Light guides 2 having other shapes than flat (FIGS. 4 and 6) and twisted as shown in FIG. 5 are also feasible.

Figure 6:
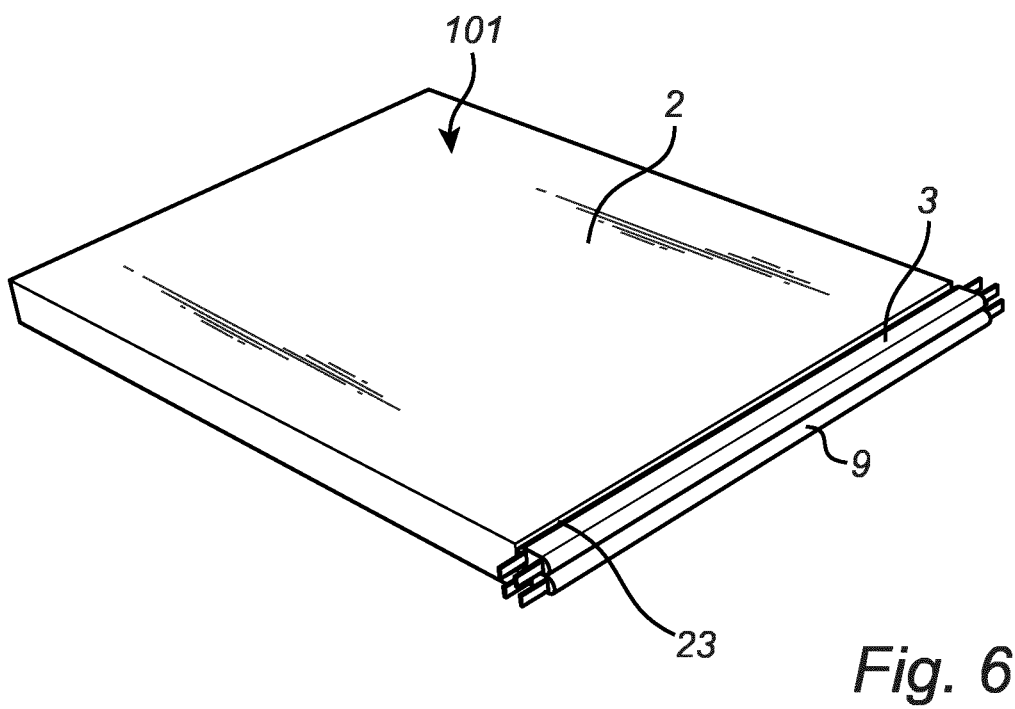
FIG. 6 shows a perspective view of a light emitting device according to a third embodiment of the invention.

FIG. 6 shows a perspective view of a light emitting device 101 according to a second embodiment of the invention. The light emitting device 101 differs from the light emitting devices 1 and 100 shown in FIGS. 4 and 5, respectively, and described above in that it comprises a further, second, solid-state light source filament 9.

The second solid-state light source filament 9 is configured and constructed in essentially the same way as the first solid-state light source filament 3 described above with reference to FIGS. 1-3. The second solid-state light source filament 9 is optically coupled to the at least one edge surface 23 of the light guide 2 in a position being different from the position of the first solid-state light source filament 3. The second solid-state light source filament 9 may further be physically coupled to the at least one edge surface 23 of the light guide 2. One or both of the first solid-state light source filament 3 and the second solid-state light source filament 9 may be encapsulated by an encapsulant 11.

The light emitted by the solid-state light sources 5 and 6 of the first solid-state light source filament 3 may be white light comprising a first color temperature, CT1, and the light emitted by the solid-state light sources of the second solid-state light source filament 9 is light comprising a second color temperature, CT2, being different from the first color temperature. The first color temperature may smaller than 2500 K, the second color temperature may be larger than 2700 K and the difference between the first and the second color temperature, CT2-CT1, may be larger than 500 K.

Figure 7:
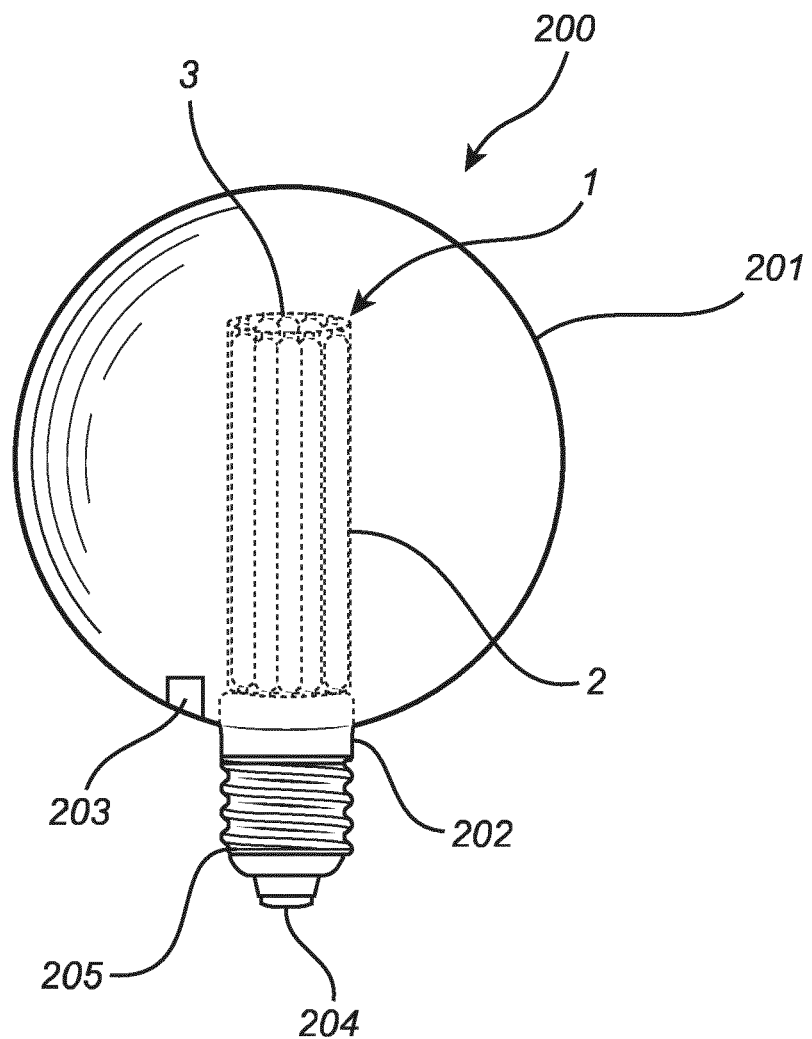
FIG. 7 shows a perspective view of a lamp comprising a light emitting device according to the invention.

FIG. 7 shows an exemplary lamp 200 comprising a light emitting device 1 according to the invention. In the embodiment shown, the light guide 2 is a crown shaped light guide and the solid-state light source filament 3 is arranged on a curved top surface of the light guide 2. The light guide 2 of such a lamp may in other embodiments comprise other shapes, such as, but not limited to, spiral-shaped, helix-shaped, twisted and flat.

The lamp 200 further comprises a controller 203 configured for individually controlling at least the first plurality of solid-state light sources 5 and the second plurality of solid-state light sources 6. The controller 203 is configured for controlling the light guide light vs. the NON-light guide light, i.e. for controlling the direct filament light.

The lamp 200 further comprises an envelope 201 at least partially enveloping the at least one light emitting device 1. The lamp 200 further comprises a cap 202. As shown on FIG. 7, the controller 203 is arranged within the envelope 201. When comprising a cap 202, the controller 203 may also be arranged inside the cap 202 such that it is hidden from view. The lamp 200 further comprises threading 205 for connection to a socket and a terminal 204 for connection to a source of electrical energy.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising a light guide and a first solid-state light source filament;
    the first solid-state light source filament comprising a carrier comprising a first side and a second side opposite to the first side, a first plurality of solid-state light sources being arranged on the first side of the carrier, and a second plurality of solid-state light sources being arranged on the second side of the carrier;
    wherein the first plurality of solid-state light sources are adapted for, in operation, emitting first solid state light source light, the first solid state light source light being emitted from a first light exit surface of the first solid-state light source filament as first output light, and the second plurality of solid-state light sources being adapted for, in operation, emitting second solid-state light source light, the second solid state light source light being emitted from a second light exit surface of the first solid-state light source filament as second output light, the first output light being different from the second output light in terms of any one or more of color points and correlated color temperatures; and wherein only one of the first side and the second side of the carrier is optically coupled to the light guide.

2. A light emitting device according to claim 1, wherein the one of the first side and the second side of the carrier being optically coupled to the light guide is further physically coupled to the light guide.

3. A light emitting device according to claim 1, wherein the light guide comprises a first major surface, a second major surface and at least one edge surface extending between the first major surface and the second major surface, and wherein the first solid-state light source filament is optically coupled to the at least one edge surface.

4. A light emitting device according to claim 3, wherein the first solid-state light source filament is further physically coupled to the at least one edge surface.

5. A light emitting device according to claim 1, wherein the light guide comprises a shape selected from the group comprising flat, crown-shaped, twisted and helix-shaped.

6. A light emitting device according to claim 1, wherein the light guide comprises light-outcoupling elements, wherein at least a part of the light which is coupled into the light guide is guided into and through the light guide, and wherein at least part of the light which is guided into and through the light guide is coupled out of the light guide via the light-outcoupling elements.

7. A light emitting device according to claim 6, wherein the light-outcoupling elements are one or more of:
arranged on a surface extending opposite to a surface to which the carrier is optically coupled, and
chosen from the group comprising refractive elements, reflective elements, diffractive elements, scattering elements and combinations thereof.

8. A light emitting device according to claim 3, and comprising a second solid-state light source filament, the second solid-state light source filament being optically coupled to the at least one edge surface in a position different from a position of the first solid-state light source filament.

9. A light emitting device according to claim 8, wherein the second solid-state light source filament is further physically coupled to the at least one edge surface in the position different from a position of the first solid-state light source filament.

10. A light emitting device according to claim 8, wherein at least one of the first solid-state light source filament and the second solid-state light source filament is encapsulated by an encapsulant, wherein
the first solid-state light source filament comprises a first encapsulant encapsulating the first plurality of solid-state light sources and a second encapsulant encapsulating the second plurality of solid-state light sources.

11. A light emitting device according to claim 10, wherein the encapsulant comprises any one or more of:
a light scattering material adapted for scattering light emitted by one or more of the first plurality of solid-state light sources and the second plurality of solid-state light sources of the first solid-state light source filament and a plurality of solid-state light sources of the second solid-state light source filament, and
a luminescent material adapted for converting at least a part of light emitted by one or more of the first plurality of solid-state light sources and the second plurality of solid-state light sources of the first solid-state light source filament and the plurality of solid-state light sources of the second solid-state light source filament.

12. A light emitting device according to claim 10, wherein the first encapsulant comprises any one or more of:
a first light scattering material adapted for scattering the first solid-state light source light emitted by the first plurality of solid-state light sources of the first solid-state light source filament, and
a first luminescent material adapted for converting at least a part of the first solid-state light source light emitted by the first plurality of solid-state light sources of the first solid-state light source filament,
and wherein the second encapsulant comprises any one or more of:
a second light scattering material adapted for scattering the second solid-state light source light emitted by the second plurality of solid-state light sources of the first solid-state light source filament, and
a second luminescent material adapted for converting at least a part of the second solid-state light source light emitted by the second plurality of solid-state light sources of the first solid-state light source filament.

13. A light emitting device according to claim 1, wherein one of the first plurality of solid-state light sources and the second plurality of solid-state light sources is adapted for providing first light in a direction away from the first surface of the carrier and the other one of the first plurality of solid-state light sources and the second plurality of solid-state light sources is adapted for providing second light in a direction away from the second surface of the carrier opposite to the first surface of the carrier.

14. A light emitting device according to claim 8, wherein the first solid-state light source light emitted by the first solid-state light source filament is white light and the second solid-state light source light emitted by the second solid-state light source filament is colored light, or
wherein the first solid-state light source light emitted by the first solid-state light source filament is white light comprising a first color temperature and the second solid-state light source light emitted by the second solid-state light source filament is light comprising a second color temperature being different from the first color temperature.

15. A luminaire or a lamp comprising at least one light emitting device according to claim 1.

* * * * *